United States Patent [19]

Schrader et al.

[11] 3,889,786

[45] June 17, 1975

[54] BRAKE DRUM COOLING STRUCTURE

[75] Inventors: Carl N. Schrader, Detroit, Mich.; Frank H. Fisher, Kenton, Ohio

[73] Assignee: Rockwell International Corporation, Pittsburgh, Pa.

[22] Filed: June 28, 1973

[21] Appl. No.: 374,326

[52] U.S. Cl. ........ 188/218 R; 29/527.5; 188/251 M; 192/107 T; 192/113 A
[51] Int. Cl. ............................................. F16d 65/10
[58] Field of Search ....... 188/218 R, 264 R, 251 M; 29/527.5; 192/113 A, 107 T

[56] References Cited
UNITED STATES PATENTS

| | | | |
|---|---|---|---|
| 1,865,311 | 6/1932 | Goostray | 188/264 R X |
| 2,059,170 | 10/1936 | Farr | 188/264 R |
| 2,091,602 | 8/1937 | Le Jeune | 188/218 R X |
| 2,563,769 | 8/1951 | Wyant | 188/264 R |
| 2,633,944 | 4/1953 | Butterfield | 188/218 R X |
| 3,003,598 | 10/1961 | Sumner et al. | 188/264 R X |

*Primary Examiner*—George E. A. Halvosa

[57] ABSTRACT

A method of manufacturing a brake drum having a plurality of axially spaced, circumferentially extending ribs provided on the exterior surface thereof. The method includes casting molten grey iron into a mold cavity formed by a plurality of axially split external mold segments spaced radially outward from an internal mold member, spacing the radially inward portions of the interfacing lateral edge surfaces of the external mold segments to form a flash base free of white iron metal at the parting line between adjacent external mold segments and, after cooling the molten iron and removing the mold members, grinding away at least a portion of the flash metal formed between the interfacing lateral edge surfaces of the external mold segments radially outward of the flash base to provide an axially extending ridge free of white iron and traversing the axially spaced ribs. The brake drum has a plurality of radially extending, heat radiating projections formed on the exterior surface thereof including a plurality of circumferentially spaced sets of helical fins with each successive set of helical fins being disposed at a helical orientation opposite to the helical orientation of the preceding set of helical fins to induce a flow of cooling air over the external surface of the brake drum regardless of the direction of rotation of the brake drum.

5 Claims, 5 Drawing Figures

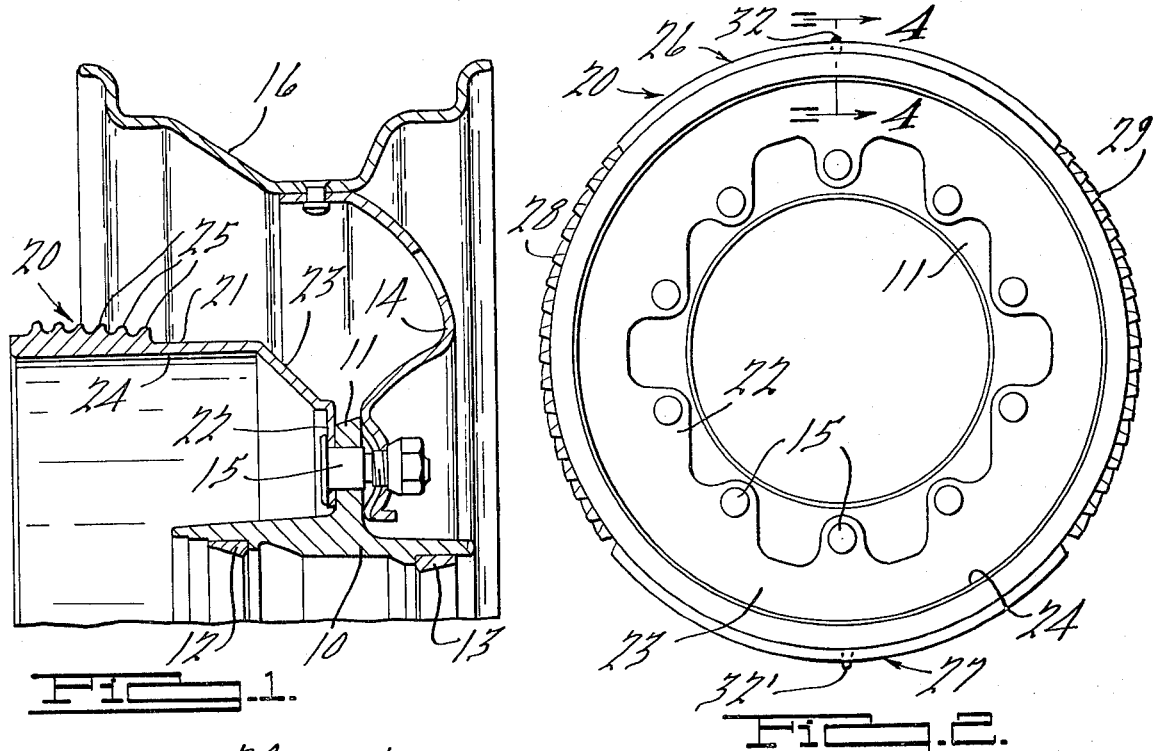
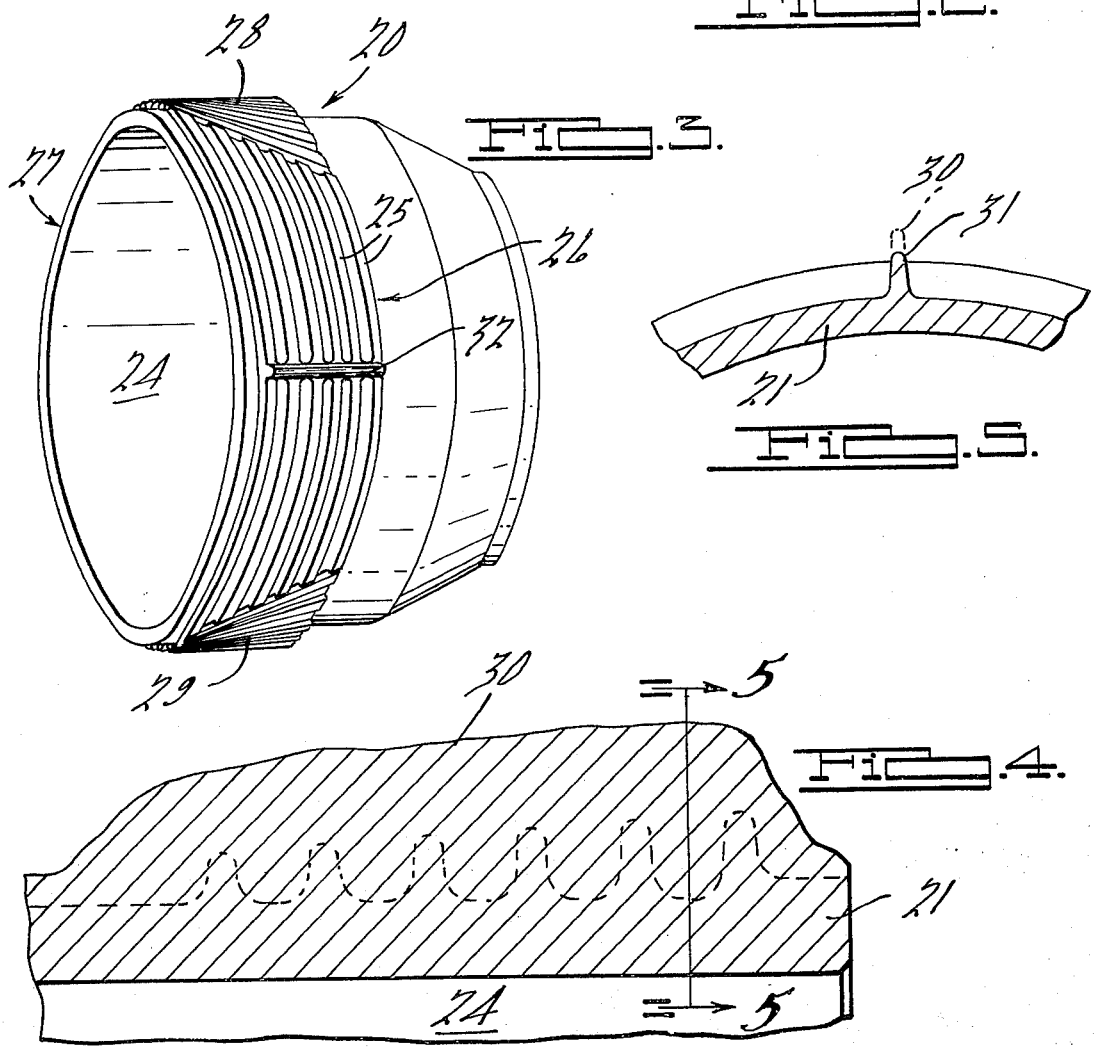

3,889,786

1

BRAKE DRUM COOLING STRUCTURE

BACKGROUND OF THE INVENTION

This invention relates to an air cooled brake drum and, more particularly, to an improved air cooled brake drum and method of manufacturing the brake drum.

Brake drums provided with radially extending projections formed on their exterior surfaces to dissipate thermal energy resulting from frictional engagement of the brake lining with the internal surfaces of the brake drums are well known in the art. Such projections have been provided in the form of axially spaced, circumferentially extending projections; circumferentially spaced, axially extending projections; and projections in the form of a helix or spiral extending laterally across the exterior surface of the brake drum. The projections serve to strengthen and reinforce the generally cylindrical main body portion of the brake drum and increase the exterior surface area of the brake drum thereby enhancing the dissipation of thermal energy. In addition, the helically oriented laterally extending projections also serve to induce a flow of cooling air over the exterior surface of the brake drum to further enhance the removal of thermal energy. Brake drums embodying the aforementioned radially extending projections are disclosed in U.S. Pat. Nos. 2,059,170, issued June 3, 1932 and 2,998,870, issued Sept. 5, 1961.

Brake drums provided with radially extending projections such as those described above have without a doubt contributed to more efficient braking operations but the brake drums provided with laterally extending helically oriented projections have traditonally been provided with the projections oriented at the same helical angle to induce a flow of cooling air in one axial direction over the exterior surface of the brake drum. Such brake drums are thus necessarily oriented to induce the desired cooling flow of air only when the brake drum is rotated in one direction and therefore are limited to use in wheel assemblies provided on one side of a vehicle. Substantially identical brake drums having laterally extending projections provided in the opposite helical orientation are presently required to produce the desired cooling flow of air in wheel assemblies on the other side of a vehicle.

Brake drums of the type to which this invention is directed are formed by casting molten metal, usually molten grey iron, into a generally annular cavity formed between an internal mold member and two or more suitably spaced and contoured external mold members or segments. The cavity may be of gradually decreasing diameter to form a conical section terminating in a radially inwardly extending mounting flange integral with the main body portion of the brake drum or, the mold members may be so arranged to cast the molten metal forming the generally cylindrical main body portion around the peripheral flange of a previously formed brake drum head or mounting plate. The foregoing techniques are both well known in the art.

In one of the heretofore known casting processes it has been common practice to use mold members having contoured molten metal contacting surfaces formed of a compacted mixture of sand and a suitable additive. Although this process has proved to be an economical and efficient process for producing many types of castings, the interfacing lateral edge surfaces of adjacent external mold segments employed to form a common contoured surface on the casting are not placed in

2 abutment with one another because the interfacing edges of the compacted said cannot be formed to produce a perfect fit. Moreover, since the fluid pressure of the molten metal cast in the mold cavity tends to separate the external mold segments during the casting process, the interfacing edge surfaces of the external mold segments are usually spaced apart to allow them to shift slightly relative to one another under influence of that fluid pressure. The external mold segments are therefore formed to allow a narrow space, usually on the order of about 1/16 inch, between the interfacing edge surfaces of the compacted sand molding surfaces. During the casting operation, the molten metal fills the mold cavity and the spaces provided between the interfacing edge surfaces of the external mold segments to provide a casting of the desired shape with a projection of flash metal extending along each parting line between the external mold segments.

The flash metal, sometimes referred to as mold flash or core flash, is formed in the spaces provided between the interfacing edge surfaces of the external mold segments and is partly comprised of a highly carbidic, brittle, white iron metal which results from rapid cooling of the molten iron. The volume of the narrow spaces provided in accordance with past practice is such that the spaces are filled with a mass of molten metal of such limited sectional thickness and thermal capacity that the thermal energy of portions of that metal is released almost instantaneously upon contact with the contoured mold segments. This rapid chilling or "under cooling" produces the undesirable, brittle, white iron metal of which the flash metal is partly composed and which, in many instances, is easily removed by grinding the entire flash metal projection off of the durable iron casting.

However, in the case of casting brake drums having a plurality of axially spaced, circumferentially extending heat radiating projections, the grinding operation required to remove flash metal extending axially across the circumferentially extending projections, particularly that portion of the flash metal in the grooves between the projections, has been considered so exacting and uneconomical that other types of exterior mold members have traditionally been used in place of axially split exterior mold segments.

It is therefore one object of the present invention to provide a more efficient and economical method of manufacturing cast iron brake drums having a plurality of axially spaced, circumferentially extending heat radiating ribs integrally formed on their exterior surface by means of a casting process which includes the use of a plurality of axially spaced external mold segments without the need for the exacting and uneconomical flash grinding operation described above, which operation is replaced by a greatly simplfied and easy to accomplish grinding step.

Another object of this invention is to provide a novel, cast iron brake drum manufactured in accordance with the method of this invention and including integrally cast, circumferentially extending heat radiating ribs traversed by a ridge of flash metal having a height approximately equal to the height of the ribs but which ridge of flash metal does not include undesirable white iron.

Another object of this invention is to provide an air cooled brake drum having a plurality of circumferential spaced sets of helical fins with each successive set of helical fins disposed at a helical orientation opposite to the helical orientation of the previous set of helical fins to induce a flow of cooling air over the exterior surface of the brake drum regardless of the direction of rotation of the drum.

A further object of this invention is to provide a brake drum having a plurality of helical fins extending laterally across the exterior surface of the brake drum in such an orientation as will induce a flow of cooling air in the desired axial direction across the exterior surface of the brake drum when the drum is mounted to a wheel assembly on either end of a vehicle axle.

SUMMARY OF THE INVENTION

A method, according to this invention, of casting a brake drum having a plurality of axially spaced, circumferentially extending projections, hereinafter referred to as "ribs," includes the use of axially split external mold member segments and completely eliminates the inefficient and uneconomical task of grinding away undesirable flash metal formed during the casting operation in the grooves between the circumferentially extending heat radiating ribs. This is accomplished by eliminating the formation of the undesirable white iron flash metal in the aforesaid grooves during the casting operation. In the method of this invention the undesirable flash metal is eliminated by providing a pair of axially split, external mold segments having generally concave, contoured interior surfaces provided with a plurality of axially spaced, circumferentially extending grooves to form a corresponding plurality of similarly disposed ribs on the brake drums, and by spacing or recessing the radially inward portions of the interfacing lateral edge surfaces of the external mold segments across the axial length of the circumferentially extending grooves to provide a flash base of substantial circumferential thickness. After casting and cooling the molten iron and removing the mold members, the flash metal formed radially outward of the flash base is ground away to provide an axially extending ridge traversing the heat radiating ribs provided on the exterior surface of the brake drum.

The air cooled, brake drum of the present invention has a plurality of circumferentially spaced groups of heat radiating ribs separated by sets of helical projections, hereinafter called "fins," with successive sets of helical fins disposed in opposite helical orientations to induce an inward flow of cooling air over the exterior surface of the brake drum regardless of the direction of rotation of the brake drum. In one embodiment, the brake drum is provided with two diametrically opposed, groups of axially spaced, circumferentially extending heat radiating ribs separated by two sets of helical fins, one set of helical fins being oriented in a righthand direction and the other set of helical fins being oriented in a lefthand direction. Traversing these ribs in the finished drum configuration cast from iron is a ridge of flash metal having a height approximately equal to the height of the ribs, which ridge includes no white iron.

DESCRIPTION OF DRAWINGS

In the drawings, wherein like numerals represent like parts:

FIG. 1 is an axial section through the upper half of a vehicle wheel assembly provided with a brake drum manufactured in accordance with the method of this invention and embodying the brake drum of this invention;

FIG. 2 is an end elevation showing the brake drum included in FIG. 1 as viewed from the open end thereof;

FIG. 3 is a persective view of the brake drum of FIG. 2;

FIG. 4 is a partial sectional view taken on the line 4—4 of FIG. 2 and showing the brake drum as it would appear during an intermediate stage of manufacture; and FIG. 5 is a sectional view taken on the line 5—5 of FIG. 4.

DESCRIPTION OF THE PREFERRED EMBODIMENT

With reference to FIGS. 1 and 2 there is shown a conventional hub 10 provided with a circumferential flange 11 and bearings 12 and 13 for rotatably mounting the hub on a vehicle axle (not shown). A brake drum generally designated by the numeral 20 and a wheel disc 14 are securely mounted to the flange 11 by conventional threaded stud and cap nut assemblies 15. A tire receiving rim 16 is secured to the disc 14.

The brake drum 20, with which the present invention is primarily concerned, is shown as an integrally cast structure comprising a generally cylindrical main body portion 21 and a radially inwardly extending mounting flange 22 joined by a conical section 23 of gradually decreasing diameter. The interior of the main body portion 21 is provided in the form of a cylindrical friction braking surface 24. The brake drum 20 is open at the end opposite the mounting flange 22. The exterior surface of the brake drum 20 adjacent the open end thereof is provided with a plurality of axially spaced, circumferentially extending ribs 25 adjacent ones of which extend axially inward from the open end of the brake drum and serve to dissipate thermal energy produced as a result of frictional engagement of brake lining with the internal surface 24. As best shown in FIG. 1 adjacent ones of the axially spaced ribs are of gradually decreasing radial height as they progress axially away from the open end of the brake drum.

In one embodiment of the brake drum of this invention there are two diametrically opposed groups of axially spaced, circumferentially extending heat radiating ribs 25, one group being clearly illustrated and identified by the numeral 26 in FIG. 3. The other, circumferentially spaced group of axially spaced, circumferentially extending heat radiating ribs 25 is provided on the diametrically opposed exterior surface of the brake drum as designated by the numeral 27 in FIGS. 2 and 3.

The two circumferentially spaced groups 26 and 27 of axially spaced, heat radiating ribs 25 are substantially identical and are separated by two sets of helical fins 28 and 29. Each set of helical fins 28 and 29 is comprised of a plurality of circumferentially spaced helical fins with the helix angle or helical orientation of one set of fins being opposite to the helix angle or orientation of the other set. The set of helical fins 28, for example, may be provided with a righthand orientation and the set of helical fins 29 may be provided with a lefthand orientation. Although the helical fins also serve to dissipate friction generated thermal energy, the main function of the helical fins is to induce a flow of cooling air over the exterior surface of the brake drum from the open end of the brake drum toward the conical section 23 which, with reference to FIG. 1, is substantially enclosed by the wheel disc 14 and rim 16. The brake drum 20 with the two sets of helical fins 28 and 29 disposed in respectively opposite helical orientation ensures that one set of helical fins is disposed in the proper orientation to induce the desired cooling flow of air over the exterior surface of the brake drum regardless of the direction the wheel assembly is rotated and the other set of helically oriented fins will serve to withdraw air from the region of the conical section 23 and thereby enhance the removal of thermal energy from the main body portion 21 of the brake drum 20.

The brake drum therefore provides adequate means for removing thermal energy from the main body portion of the brake drum regardless of the direction of rotation and thereby enables the brake drum to be used on either the left or right side of a vehicle axle which constitutes a significant advance over prior art brake drums provided with helical fins which restricted the use of such a drum to a single side of a vehicle or one end of a vehicle axle.

Although the brake drum of this invention has been described as comprising two sets 28, 29 of oppositely oriented helical fins separating two distinct groups 26, 27 of axially spaced, circumferentially extending ribs 25, the same advantageous features would be provided through the use of two or more sets of oppositely disposed helical fins separating other groups of circumferentially spaced, axially extending heat radiating projections.

The preferred method of producing the brake drum of this invention involves a molding process such as the sand molding process previously referred to and includes the use of a plurality of axially split external mold segments placed in circumferentially surrounding spaced relationship with respect to an internal mold member. This arrangement provides an annular mold cavity which serves to form the generally cylindrical main body portion of the brake drum. For the purpose of this invention, the terms "axially split external mold segment" are intended to describe a mold segment having a generally concave internal surface which provides a portion of the exterior surface of the desired brake drum, the concave internal surface being bounded by two lateral edges which are substantially in radial alignment with the longitudinal axis of the internal mold member. In the present invention it is preferred to use an internal mold member having an external surface contoured to form the interior surface of the brake drum and a pair of external mold segments, the internal surfaces of which are concavely contoured to form the exterior surface of the main body portion 21, conical section 23 and radial mounting flange 22 of the brake drum 20. The concave interior surfaces of the two external mold segments which are contoured to form the exterior surface of the main body portion 21 are provided with axially spaced, circumferentially extending grooves to form the axially spaced, circumferentially extending ribs 25 and with circumferentially spaced, helically oriented grooves to form the fins comprising the sets 28, 29 of oppositely disposed helically oriented fins. The grooves forming the helically oriented fins are provided near the center of the concavely contoured surface of each external mold segment and the axially spaced, grooves forming the circumferentially extending ribs extend circumferentially from a position spaced from the last helical groove at each end of the set of grooves in each respective mold segment to the lateral edge surface of each respective mold segment. Each external mold segment therefore serves to form one complete set 28 or 29 of helical fins and about one half of the axially spaced, circumferentially extending ribs of each group of ribs separated by that set of helical fins.

Each lateral edge surface of the axially split external mold members is spaced or recessed along the axial length of the circumferentially extending grooves to provide one boundary or side of an axially extending space or groove of substantial circumferential width when the remaining portions of the lateral edge surfaces are positioned in closely spaced interfacing relationship in the mold assembly. The lateral edge surfaces of such molds are spaced apart, a spacing distance of about 1/16 to 3/32 inch being acceptable, and this practice is followed in the mold assembly of this invention except with respect to the space provided between the radially inward portions of the interfacing lateral edge surfaces across the axial length of the axially spaced, circumferentially extending grooves. In the method of this invention the radially inward portions of the interfacing lateral edge surfaces across the axial length of the axially spaced, circumferentially extending grooves are spaced to provide a flash base of substantial circumferential thickness at the base of the parting line between the interfacing lateral edge surfaces of the exterior mold segments. Although the space provided between the radially inward portions of the lateral edge surfaces may vary with different mold assemblies it has been found that the space may be about ¼ to 5/16 inch wide and extend radially outward a distance greater than the radial depth of the axially spaced, circumferential grooves provided in the adjacent mold segments. The criteria to be followed is to provide a space or groove of sufficient width and depth to receive an adequate mass of molten metal to produce a flash base of durable iron metal extending axially across the circumferentially extending heat radiating ribs.

During the casting operation molten iron is poured into the cavity formed by the internal mold member and external segments to fill the cavity, including the grooves therein and the spaces provided between the interfacing lateral edge surfaces of the external mold segments. The axially spaced, circumferentially extending grooves of each adjacent external mold segment are open to the spaces provided between the interfacing lateral edge surfaces and are therefore in fluid communication with that space. After the molten iron cools and the mold member and segments are removed this process produces a durable iron casting of the desired shape with a pair of diametrically opposed, flash metal projections extending axially along the length of the casting.

One such projection of flash metal is identified by the numeral 30 in FIGS. 4 and 5 where the flash metal 30 is shown as it appears after the casting operation is completed. In FIG. 5 the flash metal 30 is clearly depicted as the radial extension of a flash base 31 of substantial circumferential thickness which, in accordance with the practice of this invention is provided by that molten metal which fills the space provided conjointly between the spaced, radially inward portions of the interfacing lateral edge surfaces of the exterior mold segments. The flash base 31 is comprised of durable grey iron free of brittle, white iron metal because the spacing which produces the base 31 is of sufficient length and volume to receive a mass of molten metal which will cool gradually at about the same rate of cooling as the casting. The mass of metal forming the flash base 31 is of substantial circumferential thickness and has sufficient thermal capacity to avoid the rapid cooling considered to be the main factor causing the formation of brittle, white iron in the flash metal.

The flash metal extending radially outward of the flash base 31 may be readily and economically removed by a rough grinding operation leaving the flash base 31 in the form of an axially extending ridge 32 which traverses the axially spaced, circumferentially extending ribs 25 of group 26 as best shown in FIG. 3. A similar flash metal base and projection is provided at the parting line between the external mold segments forming group 27 of circumferentially extending ribs 25 and the flash metal extending radially outward from that flash base is also removed by grinding to provide an axially extending ridge identified by the numeral 32' in FIG. 2.

The undesirable white iron metal is formed only in those portions of the flash metal projection lacking sufficient thermal capacity to retard rapid cooling, that is, the flash metal which extends radially outward from the brake drum and the flash base. The axially extending ridges 32, 32' which are comprised of durable grey iron completely free of white iron may therefore be provided by grinding away only the outer portion or all of the flash metal which extends radially outward from the flash base. Since the flash base is formed in a space having a radial dimension greater than the radial depth of the grooves forming the axially spaced, heat radiating ribs the outermost portion of the flash base may also be ground away to provide the axially extending ridge with an outer surface flush with the outer surfaces of the axially spaced, heat radiating ribs. As a matter of practice, however, it is preferred to form a flash base having a radial dimension at least 1/16 inch greater than the radial depth of the rib forming grooves and to remove all of the flash metal extending radially outward from the flash base to provide an axially extending ridge having an outer surface spaced radially outward from the outer surfaces of the axially spaced, heat radiating ribs. This practice minimizes the likelihood of marring the outer surfaces of the heat radiating ribs during the grinding operation.

The axially extending ridges also serve as heat radiating projections and further enhance the removal of thermal energy from the exterior surface of the brake drum by disrupting the boundary layer of air adjacent thereto.

The method of this invention which includes recessing the radially inward portions of the interfacing lateral edge surfaces of the exterior mold segments to provide a flash base extending across the axial width of the axially spaced, circumferentially extending ribs and then grinding away a portion of the flash metal which extends radially outward from the flash base and circumferentially extending ribs to provide a ridge free of white iron metal traversing the circumferentially extending ribs completely obviates the need to remove any undesirable flash metal from the grooves between the heat radiating ribs.

The space provided between the radially inward portions of the interfacing lateral edge surfaces of the external mold segments may be provided by recessing both of the interfacing edge surfaces equally and in opposite directions to provide a symmetrical flash metal base and projection such as that shown in FIG. 5. An alternate arrangement would be to recess the radially inward portion of only one of each pair of interfacing lateral edge surfaces to provide an asymmetrical wedge shaped flash metal base and projection.

We claim:

1. A metal brake drum comprising a cast generally cylindrical main body portion open at one axial end thereof and provided with means for mounting the drum to a wheel assembly at the other end, the interior of said main body portion comprising a cylindrical friction braking surface, the exterior of said main body portion having a plurality of radially extending heat radiating projections integrally cast and formed from the same metal as said main body portion adjacent the open end thereof, said radially extending projections comprising a plurality of circumferentially spaced sets of helical fins with each successive set of helical fins comprising a plurality of helically oriented radial projections disposed at a helical orientation opposite to the helical orientation of the projections comprising the preceding set and a plurality of circumferentially spaced groups of axially or circumferentially extending ribs with each set of helical fins separating a pair of circumferentially spaced groups of said ribs.

2. The brake drum of claim 1 wherein said exterior of said main body portion is provided with two diametrically opposed sets of helical fins, one of said sets of helical fins being comprised of a plurality of circumferentially spaced helical fins having a righthand helical orientation and the other set of helical fins being comprised of a plurality of circumferentially spaced helical fins having a lefthand helical orientation, and said sets of helical fins are separated by two groups of axially spaced circumferentially extending ribs.

3. A metal brake drum comprising a cast generally cylindrical main body portion open at one axial end, the opposite end thereof being partially closed by a radially extending flange for rotatably mounting said brake drum to an axle of a wheel assembly, said flange and said main body portion being joined by an integrally formed conical section of gradually decreasing diameter, the interior surface of said main body portion comprising a cylindrical friction braking surface, the exterior of said main body portion having integrally cast and formed from the same metal as said main body portion adjacent the open end thereof a plurality of axially spaced circumferentially extending ribs and a plurality of helical fins, said axially spaced, circumferentially extending ribs being formed as two diametrically opposed groups circumferentially separated by two sets of helical fins, each of said sets of helical fins being comprised of a plurality of circumferentially spaced helical fins with the helix angle of one set of helical fins being oppositely disposed with respect to the helix angle of the other set of helical fins to thereby orient one of said sets of helical fins in a direction which will induce a flow of air across the exterior of said main body portion from said open end toward said conical section regardless of the direction of rotation of said brake drum.

4. The brake drum of claim 3 wherein said helical fins and adjacent ones of said axially spaced, circumferentially extending ribs gradually decrease in radial height as they progress in an axial direction away from said open end of said brake drum.

5. The brake drum of claim 4 wherein said helical fins and said axially spaced, circumferentially extending ribs extend axially away from said open end of said brake drum for an axial distance less than the axial length of said braking surface.

* * * * *